United States Patent [19]

Jeppsson.

[11] 4,271,860
[45] Jun. 9, 1981

[54] VALVE

[75] Inventor: Erik H. O. Jeppsson, Lund, Sweden

[73] Assignee: Alfa-Laval AB, Tumba, Sweden

[21] Appl. No.: 971,308

[22] Filed: Dec. 20, 1978

[30] Foreign Application Priority Data

Dec. 23, 1977 [SE] Sweden ............................ 7714736

[51] Int. Cl.$^3$ ..................... F16K 23/00; F16K 31/122
[52] U.S. Cl. .................................. 137/240; 137/312; 251/DIG. 1; 251/333; 251/63.5; 251/63
[58] Field of Search ............... 137/240, 312, 238, 241, 137/237, 343; 251/63.5, 174, 176, 186, 159, 62, 63, DIG. 1, 333; 92/117 A

[56] References Cited

U.S. PATENT DOCUMENTS

| 2,361,225 | 10/1944 | Meyer | 251/63 |
|---|---|---|---|
| 2,590,466 | 3/1952 | Rued | 251/63.5 |
| 2,659,568 | 11/1953 | Grove et al. | 251/DIG. 1 |
| 2,984,450 | 5/1961 | Doe | 251/333 |
| 3,035,599 | 5/1962 | Loss | 137/240 |
| 3,583,426 | 6/1971 | Ferres | 137/240 |
| 3,641,542 | 2/1972 | Grove et al. | 137/312 |
| 4,022,241 | 5/1977 | Fox | 251/174 |
| 4,026,515 | 5/1977 | Grove | 137/312 |
| 4,163,458 | 8/1979 | Bachmonn | 137/240 |
| 4,176,673 | 12/1979 | Connor | 251/174 |

FOREIGN PATENT DOCUMENTS

| 2623301 | 5/1976 | Fed. Rep. of Germany | 137/240 |
|---|---|---|---|
| 2549113 | 4/1977 | Fed. Rep. of Germany | 251/63 |

Primary Examiner—Martin P. Schwadron
Assistant Examiner—A. Michael Chambers
Attorney, Agent, or Firm—Cyrus S. Hapgood

[57] ABSTRACT

A valve has a pressure chamber within its housing for remote operation. A stem in the housing has axial passages for power fluid and for cleaning liquid. The valve member is a sleeve, biased closed, which engages a movable seat which is resiliently supported. Leakage around the seals between the sleeve and the stem and between the sleeve and the housing is received in chambers and drained away from the housing to prevent mixing of the cleaning liquid and the processing liquids.

3 Claims, 4 Drawing Figures

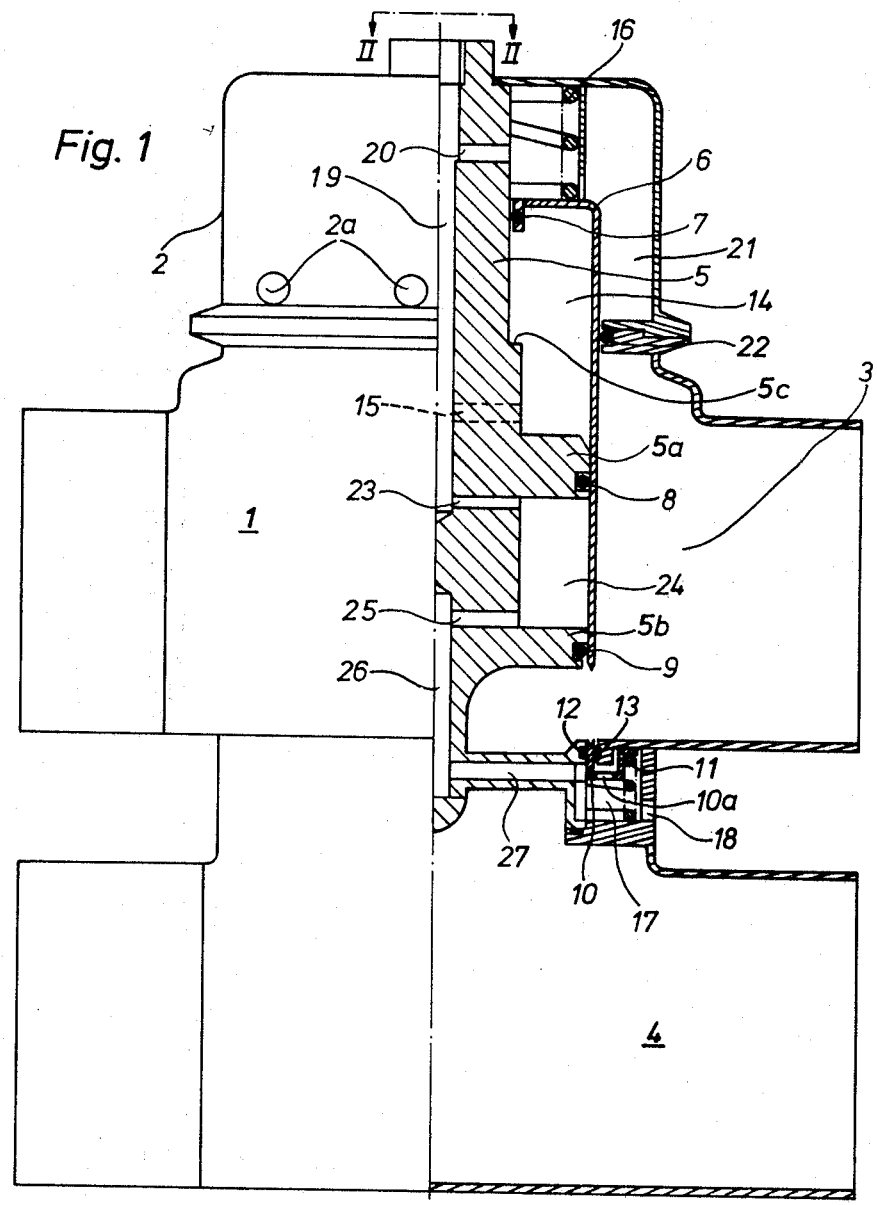

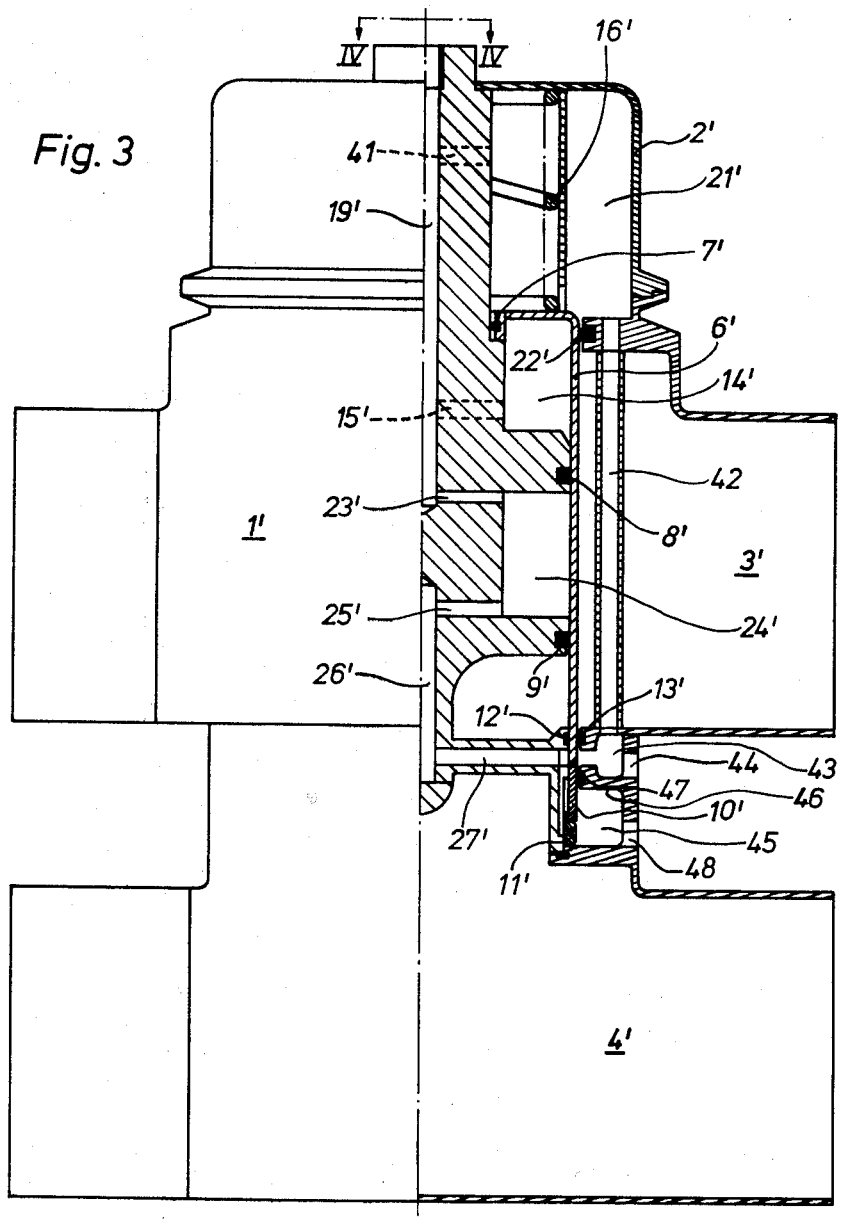

VALVE

This invention relates to pressure actuated valves and more particularly to valves for sealing off fluid, and especially, liquids, from the processing equipment of a plant, or a part thereof, while the processing equipment is being cleaned, and also for preventing mixing or contamination, by leakage, of the material being or to be processed.

Valves of this kind are known in which the flow path extends through the hollow cylindrical valve member, said member cooperating with a stationary valve seat which in a closed position covers the cross-sectional area of the valve member and shuts off said flow path. Such valves have the advantage of being balanced with regard to the pressures acting on the valve member, whereby the valve member is not actuated by any substantial resulting forces in an opening or closing direction.

In food processing plants as well as other processing plants, it is desirable to be able to shut off different sections of a plant from one another in a reliable way in order to prevent mixing of different media. For example, it is sometimes desirable to shut off one section of the plant for cleaning while the rest of the same is in operation and filled with process medium. In such cases it is necessary to ensure that cleaning liquid from the section being cleaned cannot leak into the process fluid in the operating portion of the plant.

In order to fullfill this requirement, piston valves of some kind are commonly used which are provided with double sealing means and an intermediate, drained chamber, whereby any possible leakage at one of the sealing means will be drained off.

The valves hitherto used for this purpose have appeared to suffer from a plurality of drawbacks. Thus, a small amount of liquid often leaks out during adjustment of the valve, either due to the fact that the interior of the valve is connected to the drain outlet for a moment, or because a volume enclosed between the two sealing surfaces leaks out through the same outlet. Further, these valves are susceptible to pressure shocks in that such rapid increase of pressure in one pipeline can actuate the valve in an opening direction, whereby a risk of leakage occurs. In addition, the valve itself may cause a change of pressure in the pipelines due to the change of volume occurring during the adjustment which in turn may result in a risk of leakage in other valve in the plant.

The above drawbacks have now been eliminated by means of a valve of the kind mentioned in the introduction which according to the invention is generally characterized in that the valve seat comprises a movable element having a cross-section corresponding to that of the valve member and sealing means in sliding engagement with the outer and inner surfaces of the movable element, said element being movable by the valve member against a resilient force during closing of the valve.

In a preferred embodiment of the invention, the valve member is actuable by a control means comprising a chamber enclosed by the valve member and connected to a source of pressurized fluid, said chamber being sealed off by double sealing means, drained chambers being provided between said sealing means.

The valve according to the invention provides for double safety against leakage, and no leakage of liquid occurs during the adjustment thereof. Furthermore, it is generally insusceptible to pressure shocks and does not itself cause any change of pressure during the adjustment.

Other advantages of the valve according to the invention will be apparent from the following description made with reference to the accompanying drawings, in which:

FIG. 1 shows a side elevation of a first embodiment of the invention, partly in section.

FIG. 2 is a top plan view as indicated at II—II in FIG. 1.

FIGS. 3 and 4 show corresponding views of a second embodiment of the valve according to the invention.

Figure 1A:
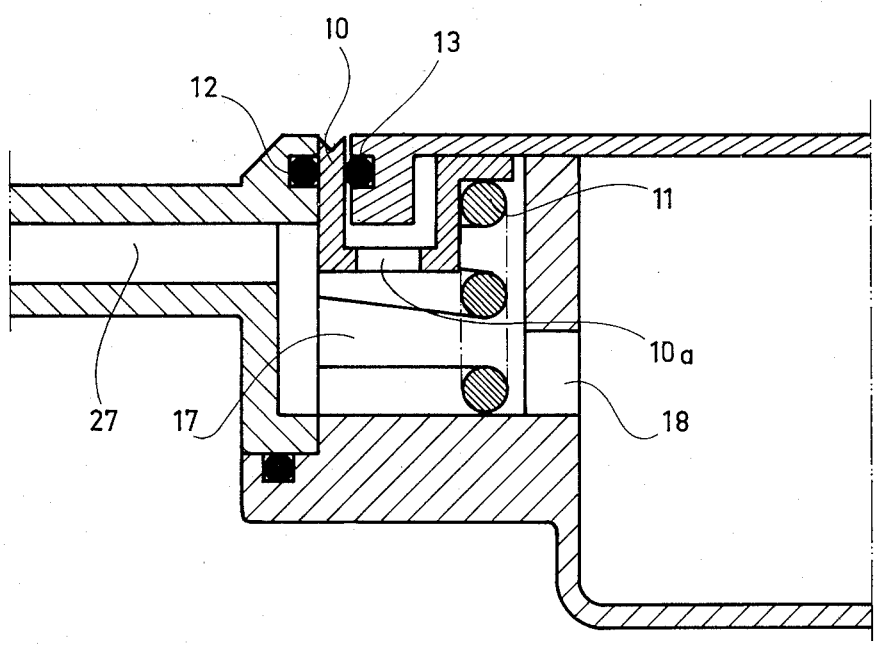
FIG. 1a is an enlarged view of certain parts of the embodiment shown in FIG. 1.

The valve shown in FIGS. 1 and 2 comprises a valve housing 1 with a cover 2. An upper pipeline 3 and a lower pipeline 4 are connected to the valve housing. In the housing 1 is provided a central stem 5 surrounded by a valve member shaped as a cylindrical sleeve member 6 provided with an upper, radially inwardly extending flange 6a. The sleeve 6 is slidable along the stem 5 and is sealed by sealings 7, 8 and 9 against the upper portion of the stem and against a middle and an annular projection 5a, 5b extending radially outward of the stem 5.

The sleeve member 6 cooperates with an annular seat member 10 which is channel-shaped in cross-section. The seat member 10 is located in the upper part of a bottom chamber or recess 17 formed in the lower portion of the housing 1. The seat member 10 is held in the upper position in which it is shown by a helical spring 11. The spring 11 also is located in the recess 17 beneath the seat member 10. The lower end of the spring rests on the floor of the recess 17, while its upper end presses against an annular lip that extends radially outwardly from the top of the outer flange of the seat member 10. In the position shown, the vertical inner flange of the valve seat 10 is sealed on both of its side walls by sealings 12, 13. In the bottom wall of the seat member 10 drain openings 10a are provided for draining possible leakage.

The sleeve member 6 is operated by supplying fluid under pressure to a working chamber 14 which is enclosed by the stem 5 and the upper portion of the sleeve member 6 and the middle stem projection 5a. The fluid, e.g. compressed air, is supplied from a pressure source (not shown) through a radial passage 15 in the stem 5. The sleeve member is moved to its open position as shown in FIG. 1 by supplying pressurized fluid to the chamber 14. This movement takes place against the action of a helical spring 16 provided between the cover 2 and the upper radial portion of the sleeve member 6.

When the valve is to be closed pressurized fluid is allowed to flow from the working chamber 14, allowing the sleeve member 6 to be pushed downward by the spring 16. The lower edge of the sleeve member 6 then engages the seat 10 which is pushed downwards against the action of the spring 11 which is weaker than spring 16. The downwards movement of the sleeve member is limited by engagement of its upper radial portion with a step 5c of the stem 5. In this lower position, the connection between the pipelines 3 and 4 is shut off and the sealings 12, 13 engage opposite sides of the sleeve member 6. In case of a leakage at either of the sealings 12 and 13, the leaking fluid will flow downwards into the underlying chamber 17 and further to the atmosphere through drain openings 18 at the bottom of the outside wall of chamber 17. There is thus no risk of a leakage from the pipeline 3 to the pipeline 4 or vice versa. Neither will there be any leakage during adjustment of the valve, since the sealings 12, 13 constantly seal against either the sleeve member 6 or the seat 10.

When the valve is to be cleaned, a cleaning liquid is supplied through an axial passage 19 in the stem 5 separate from the air passage 15 (see FIG. 2). Liquid is conveyed from the passage 19 via a radial passage 20 to the chamber 21 inside the cover 2 and is then drained off through drain openings 2a at the bottom of the wall of the cover 2. The chamber 21 is sealed from the upper pipeline 3 by means of a sealing 22.

At the same time, cleaning liquid is conveyed via a second, radial passage 23 in the stem intermediate of its length, to a lower chamber 24 situated between the two projections 5a, 5b of the stem 5 and the sleeve member 6. The liquid is conveyed out from the chamber 24 via a third radial passage 25 in the stem at the bottom of chamber 24. Passage 25 connects with an axial passage 26 in the stem leading down to a fourth radial passage or conduit 27 which connects with the chamber 17 from which the liquid is drained out through the openings 18.

During normal operation, the chamber 24 provides double safety against leakage of control fluid, whether gas or liquid, from the working chamber 14 to the pipelines 3, 4 since such leakage passing the sealing 8 will be conveyed out through the above-mentioned passages 25, 26, 27.

A second embodiment of the valve according to the invention is illustrated in FIGS. 3 and 4. In these figures the valve is shown in a closed position. The main features of this second embodiment corresponds to those of the valve shown in FIGS. 1 and 2 and the same reference numerals (e.g. 3′=3) are used for corresponding elements. However, the valve according to FIGS. 3 and 4 differs from the first embodiment with regard to the cleaning, and the object thereof is to provide a double safety against leakage of cleaning liquid. In this embodiment, the valve seat 10′ has a somewhat different shape, but is actuated by a spring 11′ as in the first embodiment. In FIG. 3, the seat member is cylindrical instead of channel-shape, and the spring 11′ presses against an enlarged bottom edge, as is apparent from FIG. 3.

In this case, the cleaning of the valve is carried out with the sleeve member 6′ in the closed position according to FIG. 3. At the same time, as cleaning liquid is flushed through the upper pipeline 3′, cleaning liquid is supplied via an axial passage 40 in the valve stem (see FIG. 4) connecting with a radial passage 41 leading to the chamber 21′ inside the cover 2′. The cleaning liquid is conveyed therefrom via vertical, tubular passages 42 (refering to FIG. 3) to an annular chamber 43 provided with drain openings 44. A possible leakage passing the sealing 22′ will not cause any difficulties in this case, since the chamber 21′ as well as the pipeline 3′ contain cleaning liquid. A possible leakage passing the sealing 13′ will also be drained out through the opening 44 and thus cannot enter the pipeline 4′. Consequently, the last mentioned pipeline can be in operation and filled with process fluid at the same time as the upper pipeline is cleaned without any risk of mixing cleaning and process fluids.

When the lower pipeline 4′ is cleaned, cleaning liquid is supplied via the passages 19′, 23′ to the chamber 24′ and further through the passages 25′, 26′, 27′ to an annular chamber 45 situated below the chamber 43 and separated therefrom by means of a radial partition 46 (horizontal in FIG. 3) provided with a sealing 47 between it and seat member 10′. The chamber 45 is provided with drain openings 48 similar to 18′ through which the cleaning liquid departs. A possible leakage passing the sealing 9′ will not matter since cleaning liquid is present on both sides of this sealing, and a possible leakage passing the sealing 12′ is drained out through the opening 48. It should be apparent from the above description that the embodiment of the valve according to the invention as shown in FIGS. 3 and 4 offers satisfactory safety against undesired leakage of cleaning liquid even during adjustment of the valve itself. It is thereby possible to clean one of the pipelines and the pertaining portion of the valve while the other pipeline is filled with process fluid. This makes it possible to maintain one part of a processing plant in operation at the same time as another part of the plant is being cleaned and interruptions of operation for cleaning the valve can be avoided.

The following features are characteristic for both embodiments of the valve according to the invention as described above.

In the closed position, the valve offers satisfactory safety against leakage between the two pipelines which is especially important within the food industry. Due to this, one portion of a processing plant can be shut off for cleaning while another portion of the plant is operating. Further, the valve is not actuatable by pressure shocks in the pipelines since thrust forces generated thereby will only actuate the valve member 6 radially and not in its direction of movement. The valve itself will neither cause any change of pressure due to change of volume during adjustment. No leakage occurs during adjustment. In addition, the valve has small dimensions and is easily disassembled for inspection and maintenance. After removal of the cover 2, 2′, the interior parts of the valve can be easily disassembled for replacement of sealings and the like.

Another important advantage is that the valve does not require any outer working cylinder or similar control gear for the adjustment movement, since the cylindrical sleeve 6, 6′ at the same time operates as a control means.

Modifications of the invention will occur to those skilled in the art. Therefore, the invention is not limited to the specific form and configuration of parts in the embodiments shown.

I claim:

1. A valve comprising a housing having a passage with entrance and exit ports for fluids passing through said housing, stem means mounted in said housing, closure means movable along said stem means for opening and closing said fluid passage, sealing means between said closure means and said stem means, seating means including means normally maintaining said seating means in a position for engagement and disengagement by said movable closure means, means mounting said seating means for movement with said closure means when said closure means engages said seating means, spring means engaging said closure means and biasing the latter into engagement with said seating means, chamber means associated with said closure means for admission of a pressurized fluid, fluid passage means connecting with said chamber means for subjecting said closure means to fluid pressure to move said closure means to valve-open position, and seat-sealing means engaging said seating means in valve-open position, to seal sad seating means against leakage of fluid thereby, said seat-sealing means becoming engaged by said closure means as said seating means is moved by said closure means.

2. A valve as defined in claim 1 having drainage means for receiving fluid leaking by said seat-sealing means and for draining such leakage from said housing.

3. A valve comprising a housing having a passage with entrance and exit ports for fluids passing through said housing, stem means mounted in said housing, closure means movable along said stem means for opening and closing said fluid passage, sealing means between said closure means and said stem means, seating means including means normally maintaining said seating means in a position for engagement and disengagement by said movable closure means, means mounting said seating means for movement with said closure means when said closure means engages said seating means, spring means engaging said closure means and biasing the latter into engagement with said seating means, chamber means associated with said closure means for admission of a pressurized fluid, fluid passage means connecting with said chamber means for subjecting said closure means to fluid pressure to move said closure means to valve-open position, said stem means having portions which in cooperation with said closure means form a second chamber means, cleaning liquid passage means in said stem means connecting with said second chamber means, and drainage passage means for said cleaning liquid from said second chamber means to outside said housing, said drainage passage means acting also during processing of media through said valve to drain leakage by said sealing means and thereby to prevent contamination of the processing media as it passes through the valve, said stem means having separate axial passages for entrance of said cleaning liquid and for entrance of said pressurized fluid.

* * * * *